No. 718,964. PATENTED JAN. 20, 1903.
J. GAWORZEWSKI.
SPOKE FASTENING DEVICE.
APPLICATION FILED NOV. 28, 1902.
NO MODEL.
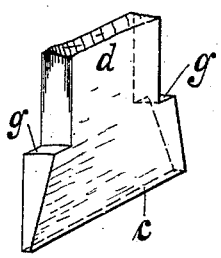
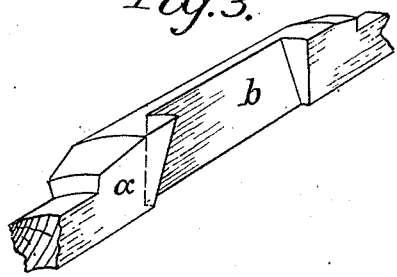
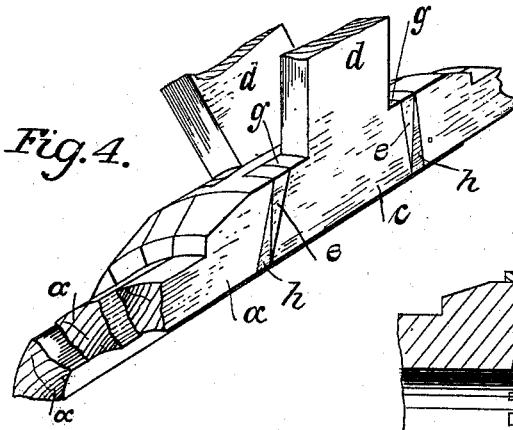
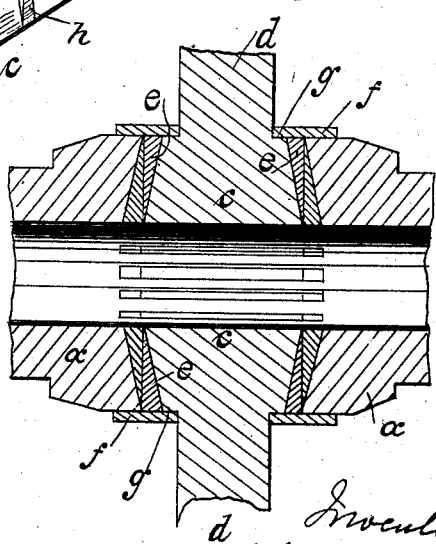
Inventor
Johannes Gaworzewski
by Saun Freeman
Attorney

United States Patent Office.

JOHANNES GAWORZEWSKI, OF FRANKFORT-ON-THE-MAIN, GERMANY, ASSIGNOR OF ONE-HALF TO PETER KLOSTER, OF FRANKFORT-ON-THE-MAIN, GERMANY.

SPOKE-FASTENING DEVICE.

SPECIFICATION forming part of Letters Patent No. 718,964, dated January 20, 1903.

Application filed November 28, 1902. Serial No. 133,052. (No model.)

*To all whom it may concern:*

Be it known that I, JOHANNES GAWORZEWSKI, a subject of the German Emperor, residing and having my post-office address at 37 Grosse Friedbergerstrasse, Frankfort-on-the-Main, Germany, have invented certain new and useful Improvements in Fastening Spokes into Naves, of which the following is a specification.

The present invention relates to the fastening of spokes into naves formed of segments and provided with recesses tapered circumferentially of the hub and dovetailed parallel to the axis of the hub. The fastening of spokes of this kind has hitherto been unsatisfactory, since either a complicated and therefore expensive device was required to fasten the spokes or the connection between the nave and the spokes was insecure.

The object of the present invention is to remove this disadvantage by the use of various means which have been used in other methods of fastening spokes.

It has been found useful to use specially broad spokes fastened by means of lateral wedges. For this reason in fastening spokes of the kind referred to the ends of the spokes are widened to form lateral shoulders, whence they continue to widen toward the center of the wheel to form a dovetail, and the spokes are fastened by driving suitably-shaped wedges between the said dovetail and the body of the nave. Thereupon rings are placed over the shoulders to secure the fastening. By simple means a fastening of the spokes is thus effected in a manner superior in simplicity, cheapness, and reliability to any hitherto known.

In the accompanying drawings, Figures 1 to 3 are perspective views of the spoke, the wedge, and one of the segments forming the nave, respectively. Fig. 4 is a perspective view of the parts Figs. 1 to 3 united together, but without the rings $f$ in place. Fig. 5 is a longitudinal vertical section with the rings $f$ in place.

The nave is formed of segments $a$, Figs. 3, 4, and 5, which are provided with recesses $b$, tapering circumferentially of the hub and dovetailed parallel to the axis of the hub. The segments $a$ having been united to form the nave, the tapered and dovetailed ends $c$ of the spokes $a$ are introduced into the said recesses $b$. These ends $c$ are at their sides broader than the spokes, thus forming shoulders $g$ at both sides. The ends $c$ being introduced into the said recesses $b$, a space is left at each side between the ends $c$ and the lateral sides of the recesses $b$. Into these spaces wedges $e$ are driven, which hold the ends $c$ in place. Before the wedges $e$ are driven in small wedges $h$ may be introduced with their broad end below into the free spaces on the sides of the ends $c$ in order to fill better the said space than is done by the wedges $e$ alone and for securing better said wedges in their place. However, these supplementary wedges may be dispensed with. The wedges $e$ having been driven in, metal rings $f$, Fig. 5, are driven on the nave, at both sides of the spokes, and held on their place by screws or otherwise. These rings $f$ lay themselves over the shoulders $g$ of the spokes and over the tops of the wedges $e$, thus holding the spokes on their place and preventing them from getting loose. If a spoke is broken and must be replaced by another one, the rings $f$ are taken off, the broken spoke is drawn out of its recess, the wedges $e$ having previously been removed, and a new spoke is introduced and fastened in the manner described above.

I claim—

The herein-described means for fastening spokes into a nave which is composed of segments $a$ with tapered recesses $b$, characterized by spokes $d$ with tapered ends $c$ having shoulders $g$, which ends are introduced into said recesses $b$ and held on their place by means of wedges driven in at both sides between the said ends $c$ and the lateral sides of the recesses $b$, rings $f$ being driven on the nave over the shoulders $g$ and the wedges on both sides of the spokes, as and for the purpose set forth.

In testimony whereof I have signed my name to this specification in the presence of two subscribing witnesses.

JOHANNES GAWORZEWSKI.

Witnesses:
    FRANZ HASSLACHER,
    MICHAEL VOLK.